United States Patent

Shiraishi et al.

[11] Patent Number: 6,155,217
[45] Date of Patent: *Dec. 5, 2000

[54] CONTROL METHOD OF AN INTERNAL COMBUSTION ENGINE

[75] Inventors: Takuya Shiraishi; Toshiharu Nogi; Minoru Ohsuga, all of Hitachinaka; Yoko Nakayama; Noboru Tokuyasu, both of Hitachi, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/087,984

[22] Filed: Jun. 1, 1998

[30] Foreign Application Priority Data

May 30, 1997 [JP] Japan ................................. 9-141386

[51] Int. Cl.⁷ .................................................. F02B 29/00
[52] U.S. Cl. ........................ 123/90.15; 123/321; 123/322; 123/346; 123/348
[58] Field of Search ........................ 123/90.11, 90.15, 123/90.16, 90.17, 90.18, 320, 321, 322, 345, 346, 347, 348

[56] References Cited

U.S. PATENT DOCUMENTS

| | | | |
|---|---|---|---|
| 5,088,460 | 2/1992 | Echeverria | 123/322 |
| 5,327,856 | 7/1994 | Schroeder et al. | 123/90.11 |
| 5,522,357 | 6/1996 | Nogi et al. | 123/261 |
| 5,564,384 | 10/1996 | Ohsuga et al. | 123/306 |
| 5,617,824 | 4/1997 | Ohsuga et al. | 123/308 |
| 5,636,611 | 6/1997 | Frankle et al. | 123/322 |
| 5,645,029 | 7/1997 | Ohsuga et al. | 123/306 |
| 5,666,916 | 9/1997 | Fujieda et al. | 123/295 |
| 5,740,771 | 4/1998 | Sebastian | 123/188.4 |

*Primary Examiner*—Weilun Lo
*Attorney, Agent, or Firm*—Evenson, McKeown, Edwards & Lenahan, P.L.L.C.

[57] ABSTRACT

A control method of an internal combustion engine with which braking force while reducing the speed of the motor vehicle can be established by generating pumping loss effectively by using a variable valve mechanism enabling to control arbitrarily the open-close timing and the lift amount of air intake and exhaust valves of the engine. When the break step-on force detection means detects a step-on force on a brake and an operation of the anti-lock brake system is selected, at least one of the intake valve or the exhaust valve is made close, another one not closed of the intake valve or the exhaust valve is made open once in a single revolution of the engine while a piston moves from a top dead center to a bottom dead center, and a lift of the valve is controlled to be a designated value.

3 Claims, 6 Drawing Sheets

CONTROL METHOD OF AN INTERNAL COMBUSTION ENGINE

BACKGROUND OF THE INVENTION

The present invention relates to a control method of an internal combustion engine controlled in response to open-close timing and lift amount of air intake and exhaust valves of the engine, specifically to a control method of an internal combustion engine for supporting braking force by means of engine braking.

Conventionally, braking force generated by braking apparatus and supplementary braking force supported by engine brake are used in order to reduce the speed of the motor vehicle. The theory of engine braking is that, as the brake pedal is operated by foot, then the accelerator pedal is released and the throttle valve for controlling the air-intake to the engine is closed, and finally a pumping loss generated due to the negative pressure in the combustion chamber. However, non-throttle engines without throttle valves are used as a system for reducing engine loss in order to increase fuel consumption efficiency.

In non-throttle engines, there occurs such a problem that the braking force generated by engine brake is not strong enough because the gas in the combustion chamber does not have negative pressure and low pumping loss.

SUMMARY OF THE INVENTION

An object of the present invention is to provide a control method of an internal combustion engine with which braking force while reducing the speed of the motor vehicle can be established by generating pumping loss effectively by using a variable valve mechanism enabling to control arbitrarily the open-close timing and the lift amount of air intake and exhaust valves of the engine.

In order to achieve the above object, what is provided is a control method of an internal combustion engine to be loaded on a motor vehicle having a valve mechanism including an air intake valve and an exhaust valve assembled with the cylinders of the internal combustion engine, a valve mechanism control means for controlling the valve mechanism, operation status detection means for detecting the operation status of the internal combustion engine, a step-on force detection means for detecting step-on force and an anti-lock braking system for preventing a side skid of the motor vehicle while quick braking operation, in which, when the step-on force detection means detects the step-on force and then, the operation of the anti-lock braking system is detected, either of the air-intake valve or the exhaust valve is made to be closed, and the other open one of the air-intake valve or the exhaust valve is made to open once in a single engine revolution while the piston moves from the top dead center to the bottom dead center, and the lift amounts of the valves are controlled so as to be a designated value.

BRIEF DESCRIPTION OF THE DRAWINGS

These and other features of the present invention are more fully described bellow in the detailed description, and in the accompanying drawings of which

DETAILED DESCRIPTION OF THE PREFERRED EMBODIMENTS

Figure 1:
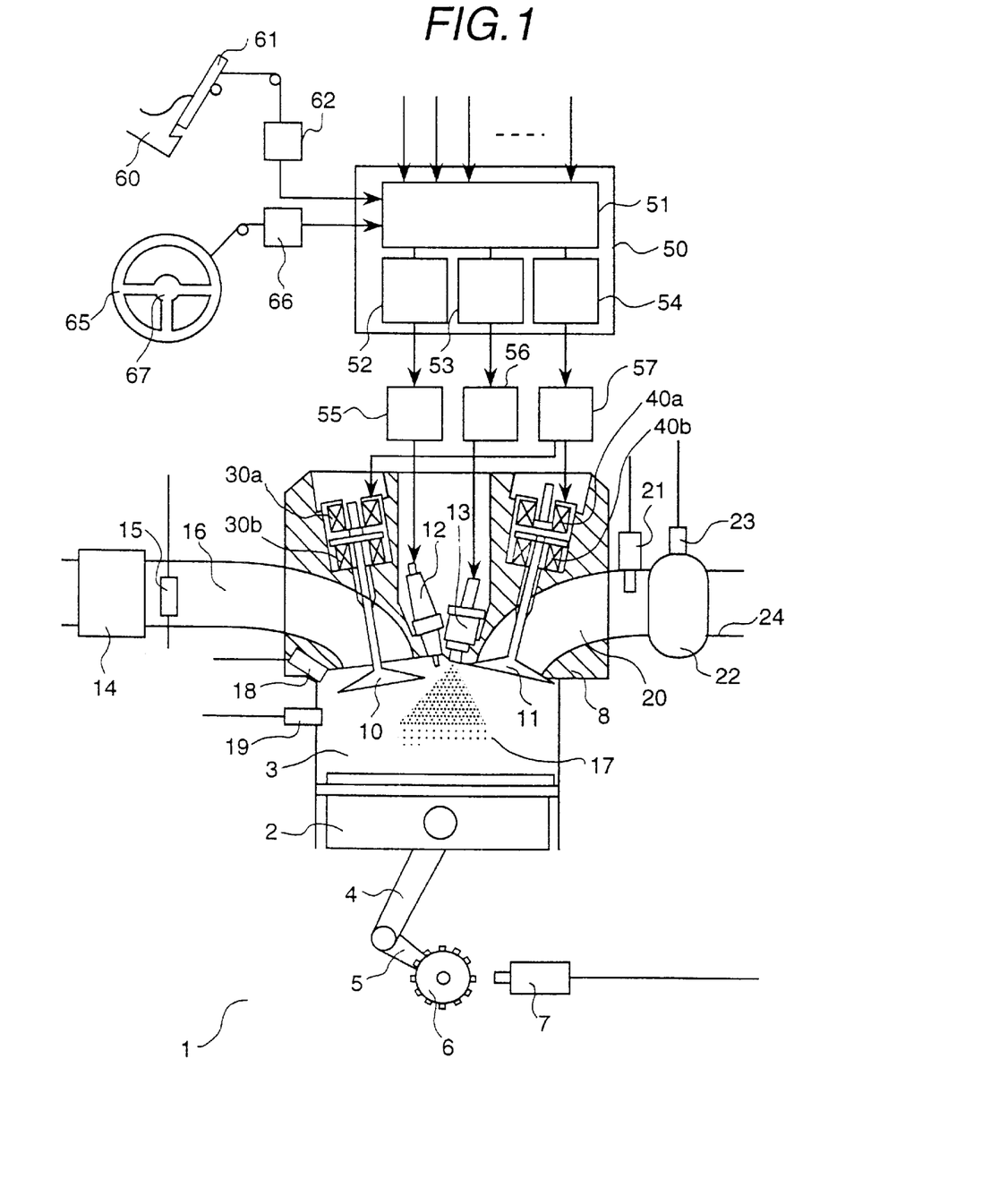
FIG. 1 is a system configuration using the present invention.

The internal combustion engine 1 (hereinafter referred to as "engine") shown in FIG. 1 has a crank mechanism including a conrod 4 and a crank shaft 5, and a combustion chamber 3 is formed by the piston 2 connected to the crank mechanism and the engine head 8 of the engine 1. The combustion engine is made to be open and close by the air-intake valve 10, the exhaust valve 11, the ignition valve 12 and the fuel injection valve 13 mounted in the engine head. The air-intake valve 10 and the exhaust valve 11 are operated by the variable valve mechanisms 30 and 40. The variable valve mechanisms 30 and 40 are preferably a valve mechanism having a structure in which the open and close operation of the valve is performed by repetitive actions of electrostatic force generated, for example, by the current running in the coil attracting the movable element fixed at the valve and operating the coils and springs above and below the movable element. The engine 1 takes air necessary to be used for combustion into the combustion chamber 3 by reciprocal action of the piston 2. The air taken into the engine 1 is filtered by the air cleaner 14 and dust contained in the air is removed. The intake air volume to be used as basis for calculating the fuel injection amount is measured by the air volume sensor 15. The control unit 50 for controlling the engine 1 has an operation status detection means 51 for detecting the operation status of the engine 1 based on signals from various sensors, a variable valve control means for controlling the operation of variable valve mechanisms 30 and 40 mounted in the engine 1, a fuel injection control means 53 for controlling the fuel amount injected from the fuel injection valve 13 and an ignition control means 52 for controlling the ignition timing at the spark plugs. Control signals from the variable valve control units 54 are supplied to the variable valve drive circuit 57, and the variable valve mechanisms 30 and 40 are operated in order to control the operation of the intake and exhaust valves 10 and 11. When trying to close the intake and exhaust valves 10 and 11, electric currents are made to be run in the coils 30b and 40b, respectively, and the movable elements are attracted. The control signal from the fuel injection control means 53 is sent to the fuel injection valve drive circuit 56 in order to control the fuel injection valve 13. The control signal from the ignition control means 52 is sent to the ignition coil 55 and ignition operations are performed by the ignition plug 12.

The operation amount of the brake pedal 61 operated by the driver 60 of the motor vehicle loaded with the engine 1 is converted into the electric signal by the brake put-on force detection means 62, and put into the operation status detection means 51 in the control unit 50. Signals supplied to the operation status detection means 51 may additionally include, for example, rotation signals supplied from the crank angle sensors 6 and 7 mounted on the crank shaft 5, air fuel ratio (A/F) supplied from the A/F sensor mounted inside the exhaust pipe, catalytic converter temperature from the temperature sensor 23 detecting the temperature of the exhaust gas catalytic converter 22, pressure inside the combustion chamber 3 from the pressure sensor 18 mounted in the combustion chamber 3 and knocking signal from the knock sensor 22. The variable valve control unit 54 puts out control signals to the variable valve mechanisms 30 a and 30b in order to operate the air intake valve 10 in responsive to the signal from the operation status detection means 51 and adjusts the air volume taken into the engine 1. The fuel injection control means 53 outputs the control signal to the fuel injection valve 13 in responsive to the signal from the operation status detection means 51, and adjusts the fuel injection amount and the fuel injection timing. The ignition control means 52 outputs the control signal to the ignition coil 55 in responsive to the signal from the operation status detection means 51, and adjusts the ignition timing. As the engine 1 does not have a throttle valve for adjusting the intake air volume inside the intake air port 16, the intake air density does not reduced and the intake air is directly taken into the combustion chamber 3. For this reason, the engine 1 is preferably a direct gas injection engine (GDI) capable of ultra lean burn operation with its A/F being 40 or more.

Figure 2:
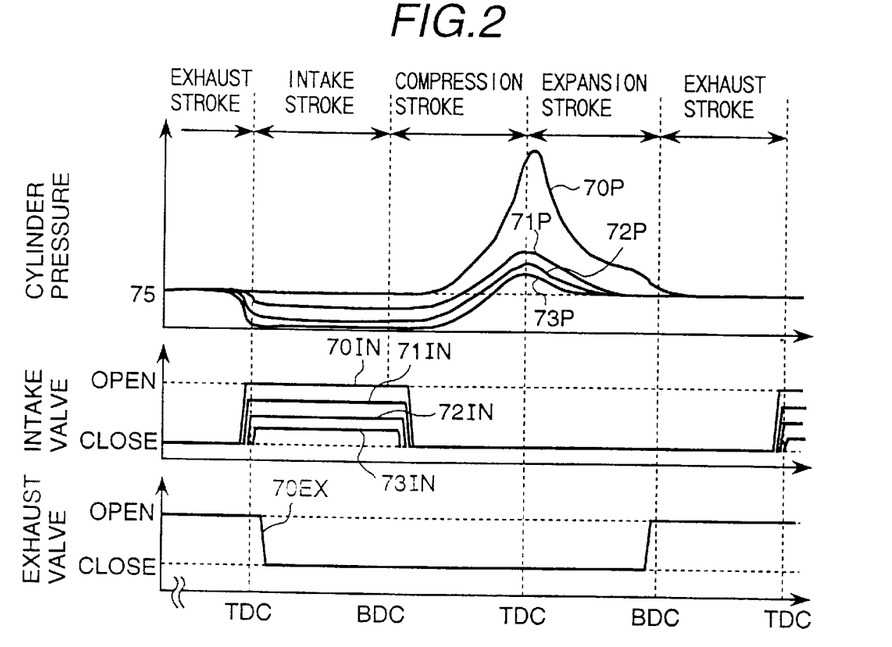
FIG. 2 is a relation between the open/close action of air intake and exhaust valves and the cylinder pressure waveform.

FIG. 2 shows a relation between the open/close operation of the intake and exhaust valves 10 and 11 and the cylinder pressure waveform. In FIG. 2, The open/close timing of the intake and exhaust valves 10 and 11 are shown for the case of normal operation conditions. The pressure diagram 70P corresponds to the combustion cycle in which the air intake valve 10 is operated with the lift 70IN and the exhaust valve 11 is operated with the lift 70EX. As the air intake valve 10 opens almost fully to the maximum lift point and consequently the intake air can be lead into the combustion chamber 3 without being narrow down, the cylinder pressure during the intake stroke becomes close to the atmospheric pressure 75, and it is found that there is almost no pump loss. If the fuel supply is made to be suspended and the fuel combustion is then interrupted in this stroke, the engine 1 can rotates itself by inertia force, and in a little while, the revolution speed reduces due to the friction loss between the piston 2 and the cylinder and the friction loss at the bearings, and finally, the engine 1 stops. This behavior of the engine is used as engine brake. However, in case that the air intake valve 10 has a lift near the maximum lift, as the pump loss while the intake stroke does not occur, the engine brake force is so weak that the time period to the engine stop may be extended to be relatively long. In making the lift of the air intake valve 10 smaller like 71IN, 72IN and 73IN, the aperture area of the air intake valve 10 becomes smaller in the intake stroke and thus, the intake air is made narrow down and the cylinder pressures become 71P, 72P and 73P, respectively. The pressure in the combustion chamber 3 becomes negative pressure in the intake stroke, and there occurs pump loss. Thus, by controlling the lift of the air intake valve 10, the pump loss, that is, the intensity of engine brake can be controlled.

Figure 3:
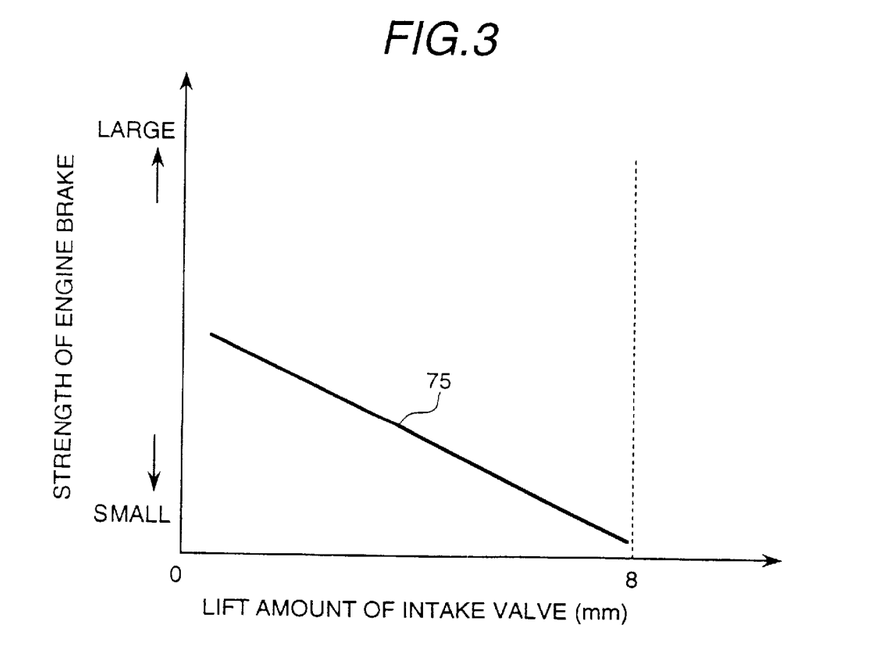
FIG. 3 is a relation between the lift of the air intake valve and the intensity of engine brake.

FIG. 3 shows a relation between the lift of the air intake valve and the intensity of engine brake. FIG. 3 shows a case that the maximum lift is assumed to be 8 mm. When the lift of the air intake valve is at most 8 mm, engine brake is applied slightly due to friction loss in the engine. As reducing the lift of the air intake valve, the power of engine brake increases as shown by the solid line 75.

Figure 4:
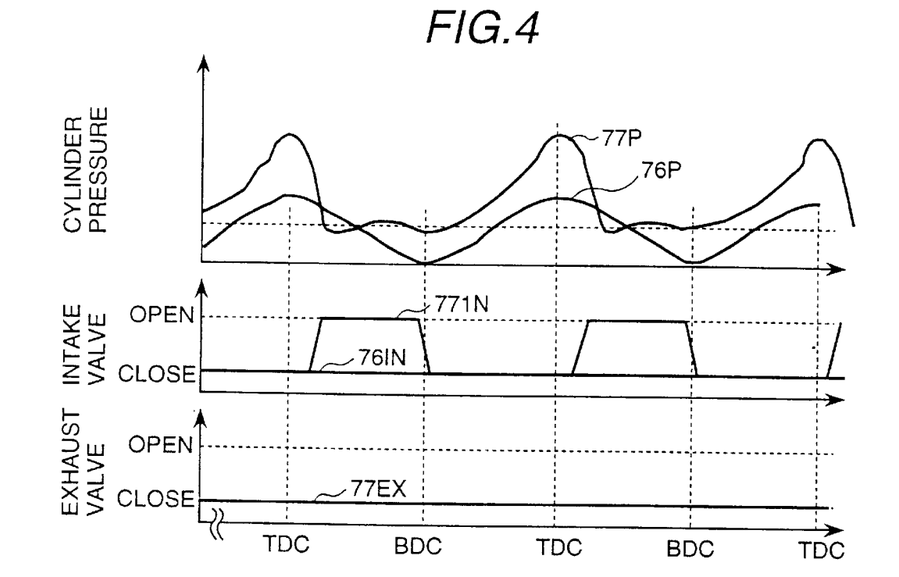
FIG. 4 is a relation between the open/close action of air intake and exhaust valves and the cylinder pressure waveform under ABS enable operation mode in another embodiment of the present invention.
Figure 5:
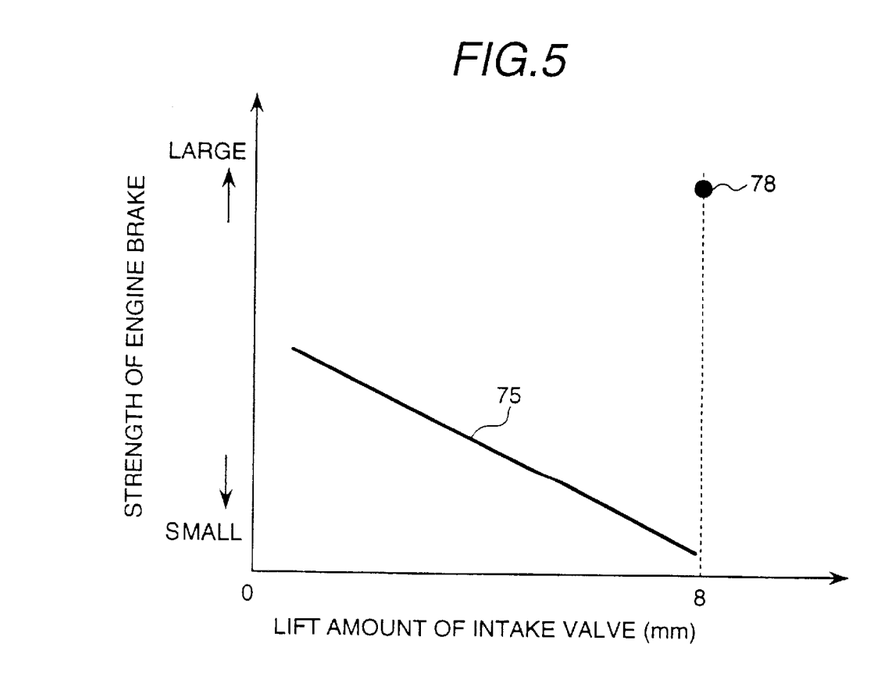
FIG. 5 is a diagram showing the intensity of engine brake operated under ABS enable operation mode.

FIG. 4 shows another embodiment of the present invention. In case that the air intake and exhaust valves 10 and 11 are closed always as shown by 76IN and 77EX, respectively, the air in the combustion chamber 3 is compressed near the top dead center (TDC in FIG. 4), and expanded near the bottom dead center (BDC in FIG. 4), and thus, the pressure in the combustion chamber 3 changes as shown by the pressure diagram 76P. In this status, the work for compression and the work for expansion are canceled each other, and the effect of engine brake is small. In case that the air intake valve is made open immediately after the top dead center as shown by the lift 77IN and made close at the bottom dead center, the pressure diagram becomes 77P in which high compression pressure is established near the top dead center. As the air intake valve 10 is made open immediately after the cylinder pressure reaches its maximum value, the compressed air in the combustion chamber 3 is discharged to the intake port 16 and the cylinder pressure decreases promptly. The air discharged to the intake port 16 is taken into the combustion chamber 3 again due to the downward movement of the piston 2, but there occurs less pump loss when the lift of the intake valve 10 reaches a maximum value. When the air intake valve 10 is made close near the bottom dead center, the air inside the combustion chamber 3 is compressed again. At this time, as there occurs work loss in the engine 1 for compressing the air, engine brake is activated. In addition, as a single compression operation is performed in a single rotation of the engine, effective engine brake can be expected. Though FIG. 4 shows an example in which the air intake valve 10 is made open and the exhaust valve is always made closed, it may be allowed to make the exhaust valve 11 open and make the air intake valve 10 always close for obtaining the similar effect. In FIG. 5, the point 78 shows the intensity of power brake. The solid line 75 represents the intensity of engine brake in case that pumping loss is generated in the intake stroke, in which the effect of engine brake becomes twice in case of using compression action.

Figure 6:
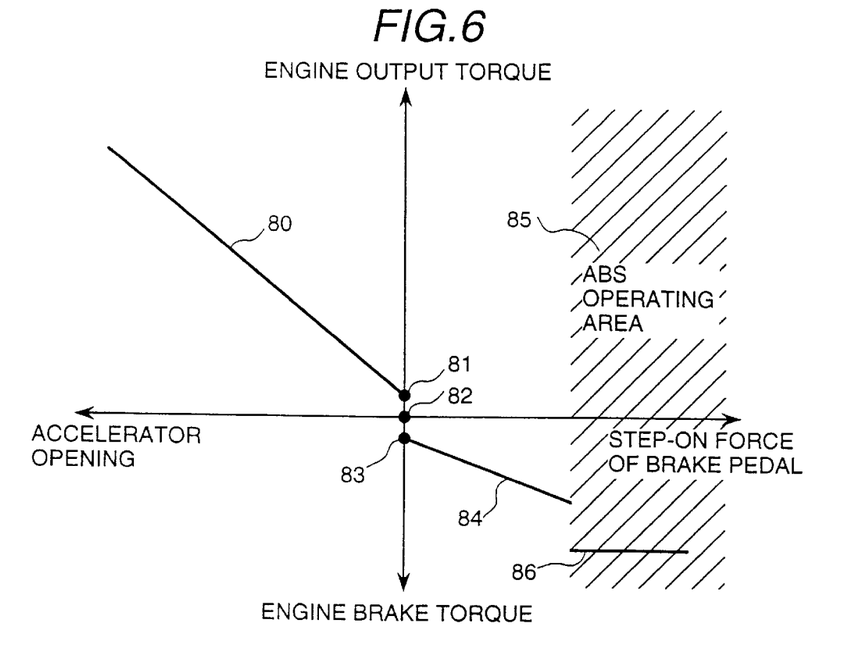
FIG. 6 is a diagram showing relations in the operation amount of accelerator pedal and brake pedal, engine output and engine brake torque.

FIG. 6 shows relations in the operation amount of accelerator pedal and brake pedal, engine output an engine brake torque. The intention of the driver 60 for starting up and accelerating the motor vehicle is reflected on the operation (step-on) amount of the accelerator pedal. In case that the step-on amount of the accelerator pedal is larger, the intention of the driver can be interpreted as one for starting the motor vehicle at a stop or requesting larger engine torque for acceleration. In contrast, in case that the step-on amount of the accelerator pedal is smaller, the load for ordinary cruising operation is low and so much engine torque is not required. Thus, the relation between the accelerator opening (step-on amount) and the required engine torque is shown by the solid line 80. As the inclination of this line changes in responsive to the revolution speed of the engine, the operation status detection means 51 detects the revolution speed and adjusts it. When slowing down the speed, the step-on amount of the accelerator pedal is zero and the driver steps on the brake pedal. The operation amount of the brake pedal is detected by the brake step-on force detection means 62 for detecting the step-on force on the brake pedal. The step-on force of the brake pedal reflects driver's intention for slowing down the motor vehicle and the braking force corresponding to the step-on force is transmitted to the brake system. According to the present invention, the engine generates engine brake torque in responsive to the brake step-on force and supports the braking force. The solid line 84 represents a relation between the break step-on force and the engine brake torque, in which effective engine brake force is generated by reducing the lift of the air intake valve. When the intention of the driver is strongly reflected on slowing down operations such as quick service, the brake step-on force is larger and the engine operation moves into the operation area 85 for the anti-lock braking system (ABS) loaded with the motor vehicle. The engine generates powerful engine brake force shown by the solid line 86 for supporting the braking force. Effective engine brake torque is generated by using compression action of the engine. States that both the accelerator pedal and the brake pedal are not step on include the following three cases; the state 82 that the engine stops, the state 81 that the motor vehicle stops but the engine is rotating (that is, idle running state) and the state 83 that the running motor vehicle slows down its speed through inertia. In the state 81, the engine generates slight engine torque so that the engine may rotate against friction loss and other mechanical losses. In the state 83, fuel supply is interrupted and engine torque by fuel explosion is not generated, but slight engine brake force equivalent to friction resistance of the engine is generated.

Figure 7:
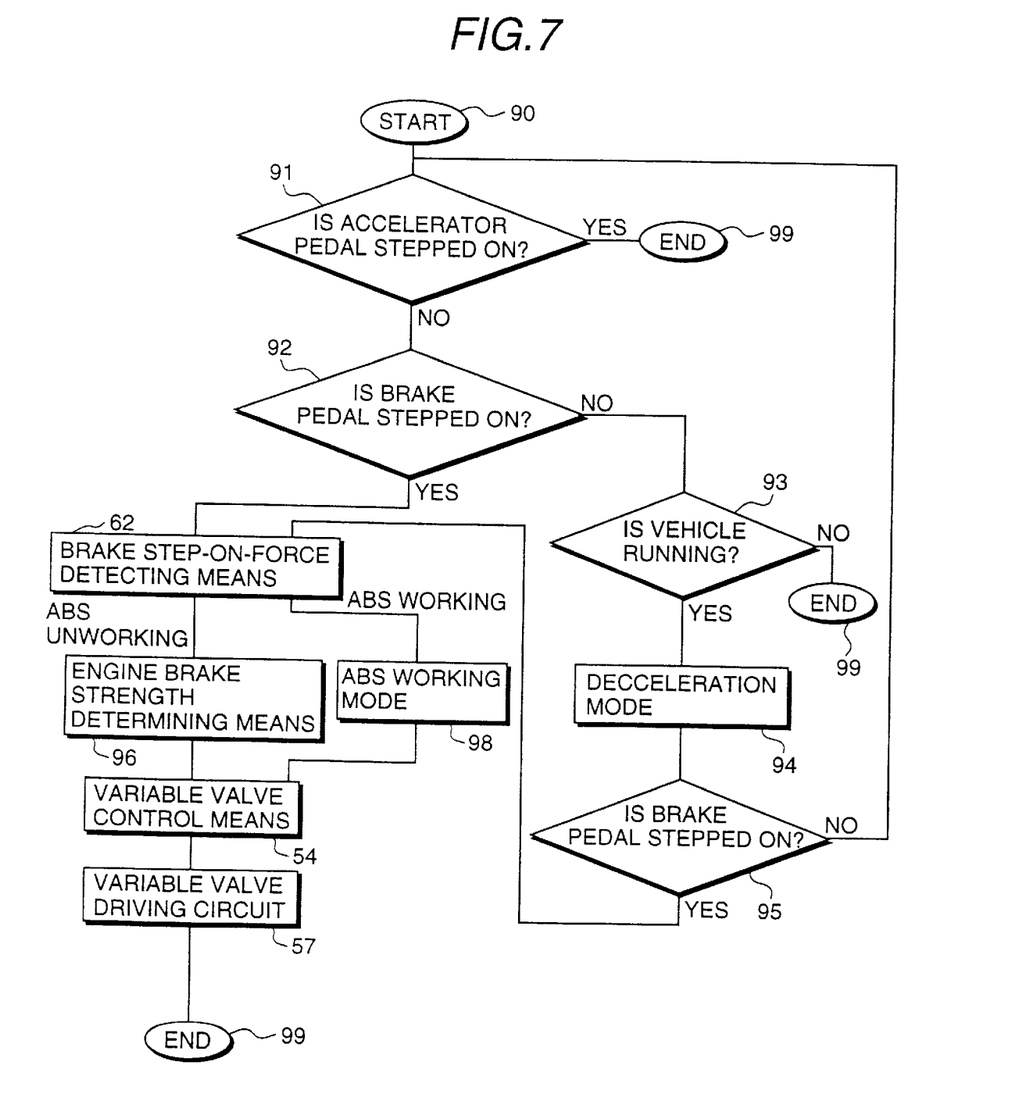
FIG. 7 is a flowchart of control for assisting braking force by engine brake.
Figure 8:
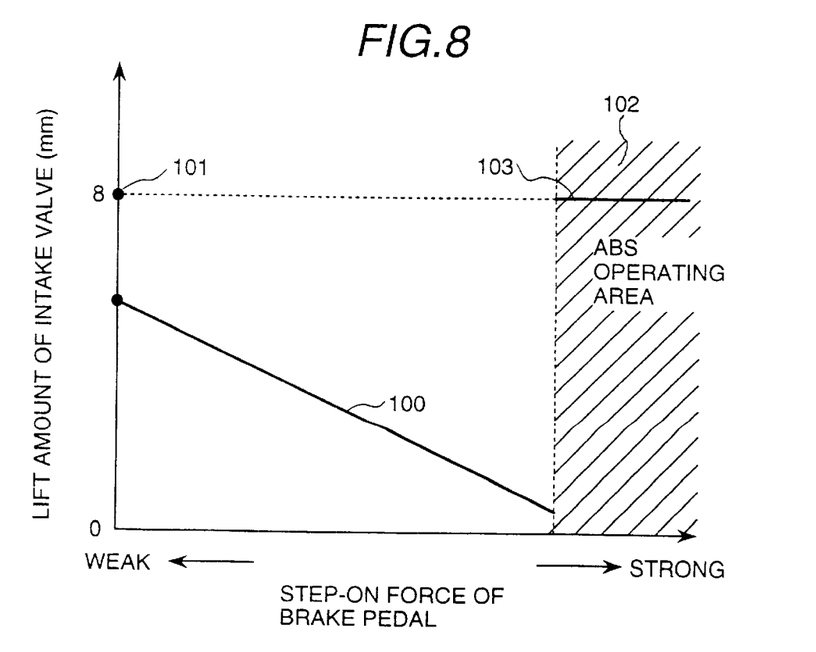
FIG. 8 is a diagram showing a relation between the step-on force on the brake pedal and the lift of the air intake valve.

FIG. 7 shows a flowchart of this embodiment. The operation status detection means 51 detects the step-on operation of the accelerator pedal is detected in block 91, in which, if the accelerator is stepped on, it is judged that the engine brake is not required and the flow is terminated. In case that the accelerator pedal is not steppped on, whether the brake pedal 61 is stepped on or not is judged in block 92. If the brake pedal 61 is not stepped on, block 93 is selected next in order to detect the speed of the motor vehicle and judge whether the motor vehicle runs or not. In case that the speed of the motor vehicle is zero, the motor vehicle is judged to stop, and the flow is terminated. If block 93 judges that the speed of the motor vehicle is not zero, the motor vehicle runs through inertia. In this case, the operation mode is switched to deceleration mode in block 94, the lift of the air intake valve is set to be a designated fractional value of the maximum lift (for example, 0.7 of the maximum lift) and engine brake is operated with pump loss by generating negative pressure in the combustion chamber 3. By this operation, the speed of the motor vehicle gradually decreases. In block 95, the step-on amount of the brake pedal 61 is detected again, and if it is judged that the brake pedal is not step on, the flow goes back to the initial block 91. In case that block 95 or 92 judges that the brake pedal 61 is stepped on, the brake step-on force detection means 62 judges the step-on force on the brake pedal as shown in FIG. 8, and whether the engine is in the operation area in which the anti-lock braking system loaded on the motor vehicle can be activated is judged. In case that it is judged that ABS is disabled, the lift of the air intake valve 10 is determined and the control signal is put out so that engine brake may be operated in responsive to the brake step-on force in block 96 for the engine brake intensity determination means. In case that it is judged that ABS is enabled, the engine operation mode is switched to ABS enable mode, and the lift of the air intake valve 10 or the exhaust valve 11 and the open/close timing of those valves is determined and the control signal is put out so that the powerful engine brake by compression action may be activated. The control signal from Block 96 or 98 is sent to the variable valve control unit 54 and the air intake and exhaust valves 10 and 11 are operated by the variable valve drive circuit 57.

Figure 9:
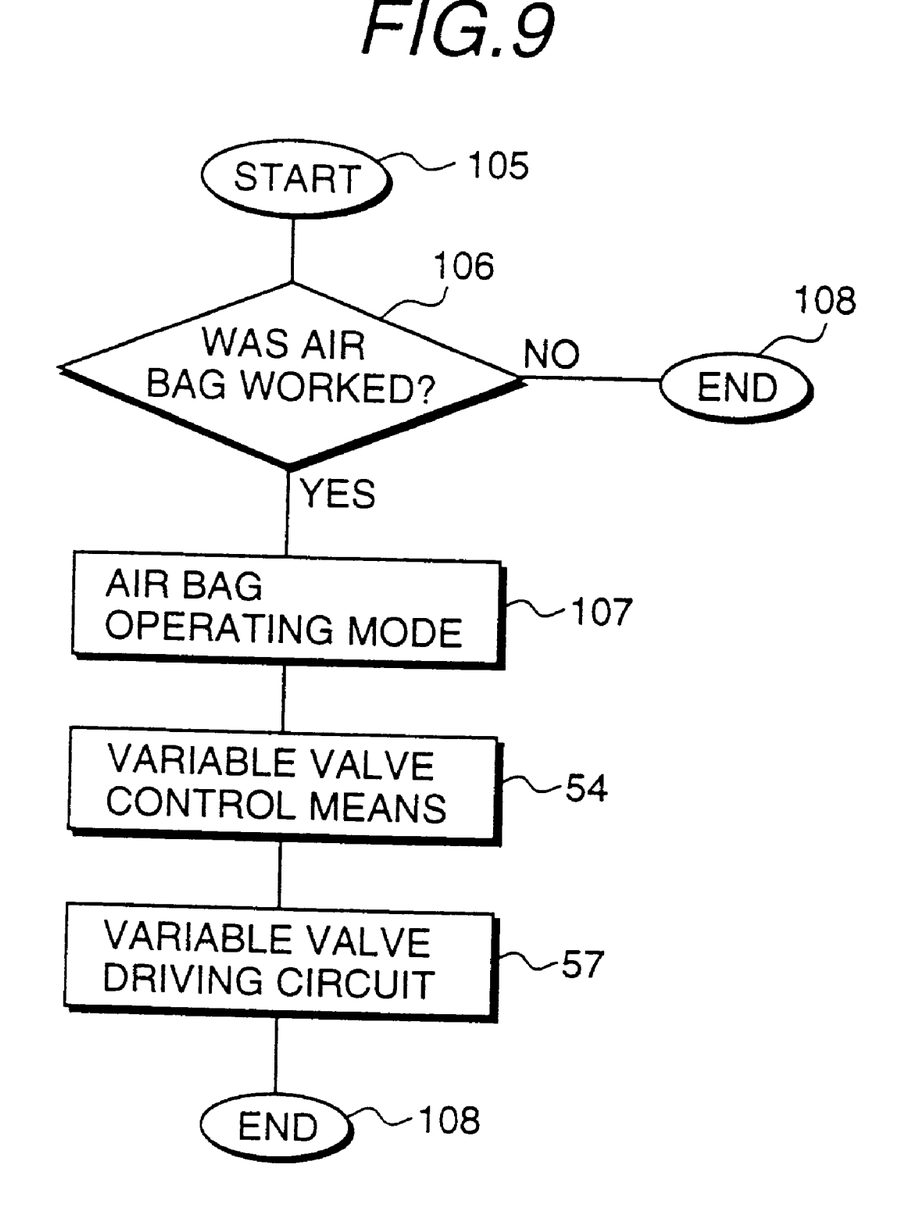
FIG. 9 is a flowchart of another embodiment of the present invention.

Another embodiment of the present invention is described below. In case that the motor vehicle loaded with the engine 1 having the variable valve mechanisms 30 and 40 as shown in FIG. 1 is crashed so that the air bag 67 mounted in the steering wheel 65 may be operated, the fuel 17 injected into the combustion chamber 3 may remain unburned and stay in the combustion chamber 3. In this case, the engine 1 may stop and, especially in case that the exhaust valve remains open, the fuel 17 staying in the combustion chamber 3 may flow out to the exhaust pipe 24. As the exhaust pipe 24 is always exposed into the high temperature exhaust gas and heated up to about 300° C., in case that the fuel 17 leaks from the combustion chamber 3 to the exhaust pipe 24, there may occurs fire. FIG. 9 shows a flowchart in this embodiment. When the motor vehicle crashes, in block 106, the operation status detection means 51 detects whether the air bag 67 loaded on the motor vehicle is operated by using the air bag detection means 66. In case that the operation of the air bag 67 is detected, block 107 is selected next, in which the airbag operation mode is established and control signals for closing the air intake and exhaust valves 10 and 11 are put out to the variable valve control unit 54. The variable valve control unit 54 makes the electric current run into the coils 30a and 40a used for closing valves in the variable valve drive circuit 57, and closes the air intake and exhaust valves 10 and 11, and close the combustion chamber 3. As a result, it can be prevented that the unburned fuel 17 staying in the combustion chamber 13 may leaks out to the exhaust pipe 24 and makes fire.

In the control method of the internal combustion engine in the present invention, as the engine brake operation mode of the variable valve mechanism can be controlled in accordance with the braking system loaded on the motor vehicle, and the braking force for the motor vehicle can be assisted, it will be appreciated that downsizing and simplification of the braking system can be established.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A control method of an internal combustion engine in a motor vehicle, comprising:

a valve mechanism including an intake valve and an exhaust valve combined with a cylinder of said internal combustion engine;

a valve mechanism control means for controlling said valve mechanism;

an operation status detection means for detecting an operation status of said internal combustion engine;

a brake step-on force detection means for detecting step-on force on a brake; and an anti-lock brake system;

the method comprising the steps, when said brake step-on force detection means detects said step-on force on said brake and said anti-lock brake system is activated, of closing at least one of said intake valve and said exhaust valve, opening another of said intake valve and said exhaust valve during a suction stroke of the cylinders and controlling a lift of the another of said intake valve and said exhaust valve for restricting a path area of air exiting the cylinder during a compression stroke to control magnitude of compression for engine braking.

2. A control method for an internal combustion engine without a throttle valve in an induction system of a motor vehicle, comprising a valve mechanism having an intake valve and an exhaust valve combined with a cylinder of said internal combustion engine; means for controlling said valve mechanism; means for detecting an operation status of said internal combustion engine; means for detecting a step-on force on a brake; and an anti-lock brake system, the method comprising the steps of closing at least one of said intake valve and said exhaust valve when said brake step-on force detecting means detects said step-on force on said brake and said antilock brake system is activated, opening another of said intake valve and said exhaust valve during a cylinder suction stroke, and controlling a lift of said another of said intake valve and said exhaust valve for restricting a path area of air exiting said cylinder during compression of the air within said cylinder to control compression magnitude for an engine braking effect.

3. A control method for an internal combustion engine without a throttle valve in an induction system of a motor vehicle, comprising a valve mechanism including an intake valve and an exhaust valve combined with an engine cylinder of said internal combustion engine; means for controlling said valve mechanism; means for detecting an operation status of said internal combustion engine; and means for detecting demand for vehicular deceleration, the method comprising the steps of operating said valve mechanism control means responsive to demand for vehicular deceleration, for driving said valve mechanism for maintaining first one of said intake valve and an exhaust valve closed, opening a second one of said intake valve and said exhaust valve for introducing air into said engine cylinder during a suction stroke of a piston in said engine cylinder, and reducing a valve lift of said second one of said intake valve and said exhaust valve for controlling an amount of the air entering into said engine cylinder during a suction stroke of a piston in said engine cylinder, and reducing a valve lift of said second one of said intake valve and said exhaust valve for restricting a path area for the air exiting said engine cylinder in a controlled manner during a compression stroke of said piston for controlling air compression magnitude within said engine cylinder and generating resistance against motion of said piston for an engine braking effect.

* * * * *